United States Patent
Boice et al.

(10) Patent No.: US 7,072,393 B2
(45) Date of Patent: Jul. 4, 2006

(54) MULTIPLE PARALLEL ENCODERS AND STATISTICAL ANALYSIS THEREOF FOR ENCODING A VIDEO SEQUENCE

(75) Inventors: Charles Boice, Endicott, NY (US); Joseph G Schaefer, Berkshire, NY (US); Brian J Cascarino, Apalachin, NY (US); Charles C Stein, Peckville, PA (US)

(73) Assignee: International Business Machines Corporation, Armonk, NY (US)

( * ) Notice: Subject to any disclaimer, the term of this patent is extended or adjusted under 35 U.S.C. 154(b) by 628 days.

(21) Appl. No.: 09/888,964

(22) Filed: Jun. 25, 2001

(65) Prior Publication Data

US 2003/0012275 A1    Jan. 16, 2003

(51) Int. Cl.
*H04N 7/18*        (2006.01)
*H04B 1/66*        (2006.01)

(52) U.S. Cl. .................................... 375/240.01
(58) Field of Classification Search ........... 375/240.01, 375/240.16, 240.27, 240.05, 240.28, 240.02, 375/240.26; 348/133, 387.1, 405.1, 404.1, 348/402.1, 409.1, 459; 382/239; 709/247; 725/138; H04B 1/66; H04N 7/18
See application file for complete search history.

(56) References Cited

U.S. PATENT DOCUMENTS

| | | | | |
|---|---|---|---|---|
| 5,115,309 A | * | 5/1992 | Hang ...................... | 348/388.1 |
| 5,216,503 A | | 6/1993 | Paik et al. ................. | 358/133 |
| 5,325,199 A | * | 6/1994 | Childs ........................ | 348/459 |
| 5,367,629 A | | 11/1994 | Chu et al. ................... | 395/162 |
| 5,506,844 A | | 4/1996 | Rao ............................. | 370/84 |
| 5,528,628 A | * | 6/1996 | Park et al. ................... | 375/240 |
| 5,579,121 A | | 11/1996 | Ohta et al. ................... | 386/109 |
| 5,708,664 A | | 1/1998 | Budge et al. ............... | 370/538 |
| 5,724,091 A | * | 3/1998 | Freeman et al. ............. | 725/138 |
| 5,793,425 A | | 8/1998 | Balakrishnan ............... | 348/387 |
| 5,850,527 A | * | 12/1998 | Suzuki ........................ | 709/247 |
| 5,929,914 A | | 7/1999 | Normand ..................... | 348/405 |
| 5,956,426 A | | 9/1999 | Matsuura et al. ........... | 382/239 |
| 5,959,764 A | | 10/1999 | Sun et al. .................... | 348/404 |
| 5,978,029 A | | 11/1999 | Boice et al. ................. | 348/412 |

(Continued)

FOREIGN PATENT DOCUMENTS

JP        5-176173        7/1993

OTHER PUBLICATIONS

"Apparatus for Dynamic Parameter Changes in an MPEG-2 Encoder", Research Disclosure, Apr. 1999, p. 42095, Disclosed by International Business Machines Corporation.

*Primary Examiner*—Tung Vo
(74) *Attorney, Agent, or Firm*—William H. Steinberg, Esq.; Kevin P. Radigan, Esq.; Heslin Rothenberg Farley & Mesiti, P.C.

(57) ABSTRACT

System and method are provided for optimally encoding a sequence of video frames using image statistics collected from multiple encoders connected in parallel, each encoder employing a different set of encode parameters. The image statistics are used to select an optimum set of encode parameters for use in encoding the sequence of video frames in a subsequent encode subsystem stage. As an alternative, multiple buffers are connected to the outputs of the multiple, parallel connected encoders, with the encoded stream from the encoder employing the optimum set of encode parameters selected for output as the bitstream of encoded video data.

36 Claims, 8 Drawing Sheets

U.S. PATENT DOCUMENTS

| | | |
|---|---|---|
| 6,040,861 A | 3/2000 | Boroczky et al. ............ 348/409 |
| 6,052,488 A | 4/2000 | Takahashi et al. ........... 382/239 |
| 6,081,622 A | 6/2000 | Carr et al. ................... 382/236 |
| 6,097,757 A | 8/2000 | Boice et al. ................. 375/240 |
| 6,101,276 A | 8/2000 | Adiletta et al. .............. 382/236 |
| 6,118,823 A | 9/2000 | Carr ....................... 375/240.28 |
| 6,188,729 B1* | 2/2001 | Perkins .................... 375/240.2 |
| 6,859,496 B1* | 2/2005 | Boroczky et al. ...... 375/240.26 |

* cited by examiner

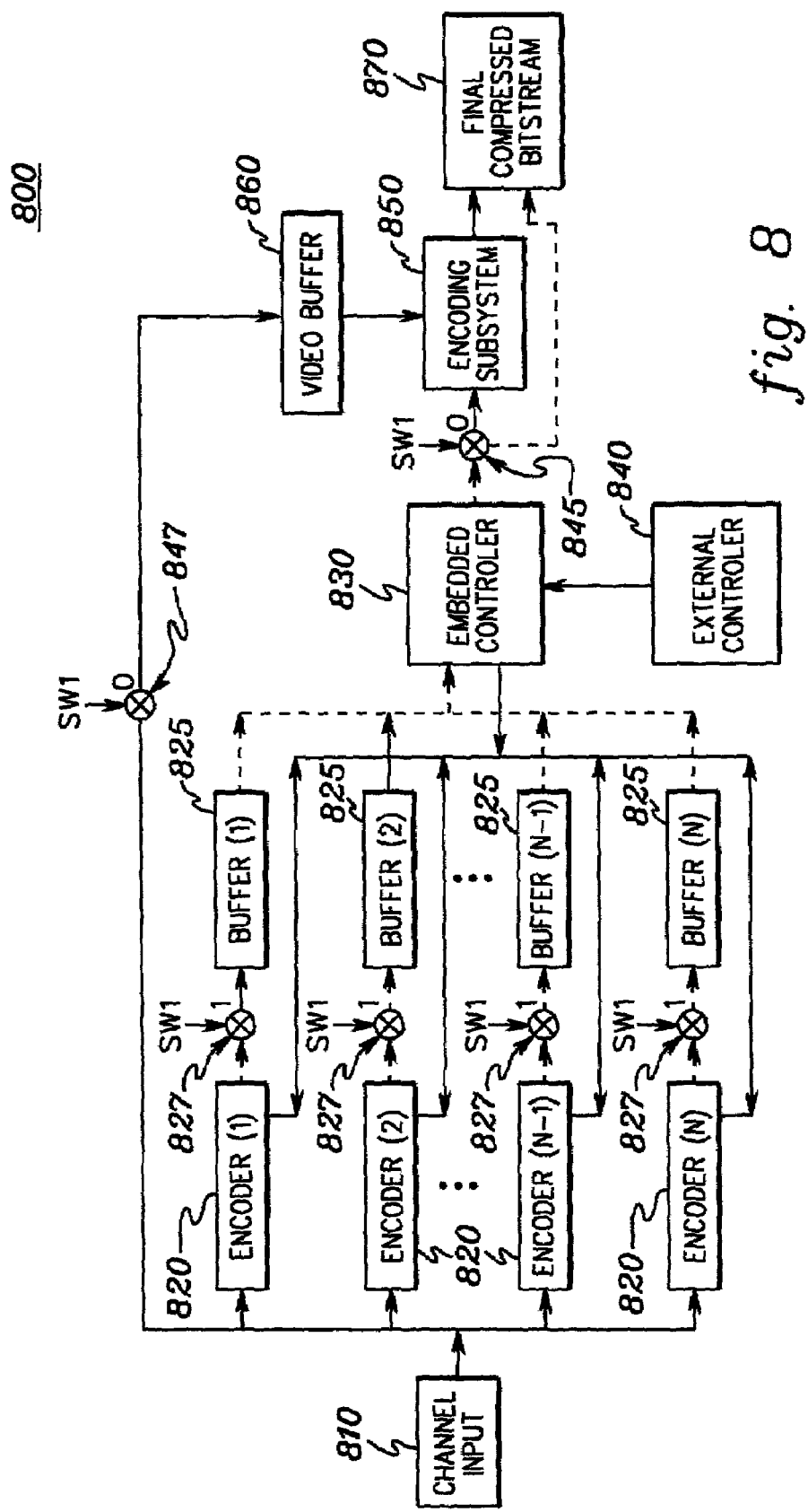

MULTIPLE PARALLEL ENCODERS AND STATISTICAL ANALYSIS THEREOF FOR ENCODING A VIDEO SEQUENCE

CROSS-REFERENCE TO RELATED PATENTS/APPLICATIONS

This application contains subject matter which relates to the subject matter of the following commonly-owned patents, each of which is hereby incorporated herein by reference in its entirety:

"Adaptive Real-Time Encoding of Video Sequence Employing Image Statistics", U.S. Pat. No. 6,040,861, issued Mar. 21, 2000;

"Real-Time Variable Bit Rate Encoding of Video Sequence Employing Image Statistics", U.S. Pat. No. 6,097,757, issued Aug. 1, 2000;

"Real-Time Encoding of Video Sequence Employing Two Encoders and Statistical Analysis", U.S. Pat. No. 5,978,029, issued Nov. 2, 1999;

"Control Scheme For Shared-Use Dual-Port Predicted Error Rate", U.S. Pat. No. 6,118,823, issued Sep. 12, 2000; and "Optimized Field-Frame Prediction Error Calculation Method and Apparatus In A Scalable MPEG-2 Compliant Video Encoder", U.S. Pat. No. 6,081,622, issued Jun. 27, 2000.

TECHNICAL FIELD

This invention relates, in general, to compression of digital visual images, and more particularly, to a multi-stage technique for encoding a video sequence using image statistics derived from multiple encoders connected in parallel, each employing a different set of encode parameters, to select an optimum set of encode parameters for use in encoding the sequence of video frames in a subsequent encode subsystem stage.

BACKGROUND OF THE INVENTION

Within the past decade, the advent of world-wide electronic communications systems has enhanced the way in which people can send and receive information. In particular, the capabilities of real-time video and audio systems have greatly improved in recent years. In order to provide services such as video-on-demand and video conferencing to subscribers, an enormous amount of network bandwidth is required. In fact, network bandwidth is often the main inhibitor in the effectiveness of such systems.

In order to overcome the constraints imposed by networks, compression systems have emerged. These systems reduce the amount of video and audio data which must be transmitted by removing redundancy in the picture sequence. At the receiving end, the picture sequence is uncompressed and may be displayed in real-time.

One example of a video compression standard is the Moving Picture Experts Group ("MPEG") standard. Within the MPEG standard, video compression is defined both within a given picture and between pictures. Video compression within a picture is accomplished by conversion of the digital image from the time domain to the frequency domain by a discrete cosine transform, quantization, and variable length coding. Video compression between pictures is accomplished via a process referred to as motion estimation and compensation, in which a motion vector plus difference data is used to describe the translation of a set of picture elements (pels) from one picture to another.

The ISO MPEG-2 standard specifies only the syntax of bitstream and semantics of the decoding process. The choice of coding parameters and tradeoffs in performance versus complexity are left to the encoder developers.

One aspect of the encoding process is compressing a digital video image into as small a bitstream as possible while still maintaining video detail and quality. The MPEG standard places limitations on the size of the bitstream, and requires that the encoder be able to perform the encoding process. Thus, simply optimizing the bit rate to maintain desired picture quality and detail can be difficult.

SUMMARY OF THE INVENTION

This invention seeks in part to enhance picture quality of an encoded video sequence while still obtaining a high compression rate by providing multiple encoders and statistical analysis thereof as a first stage in a multi-stage encode process, wherein the latter stage employs the set of parameters which produces, for example, a best encoded picture quality in the first stage.

Briefly summarized, in one aspect, a system is provided herein for encoding a sequence of video frames, which utilizes multiple encoders connected in parallel. Each encoder is connected to receive the identical sequence of video frames for independent encoding thereof. Each encoder of the multiple encoders employs a set of encode parameters, with at least one encode parameter of the sets of encode parameters being varied between two or more encoders of the multiple encoders connected in parallel. The encoding system further includes a controller coupled to the multiple encoders for selecting one set of encode parameters from the sets of encode parameters which best meets an encode objective. Further, this system includes means for outputting a bitstream of encoded video data from the sequence of video frames using the selected one set of encode parameters.

In another aspect, the invention comprises a method of encoding a sequence of video frames which includes: encoding the sequence of video frames employing multiple parallel connected encoders, each encoder of the multiple encoders receiving the identical sequence of video frames for encoding thereof, wherein each encoder of the multiple encoders employs a set of encode parameters, at least one encode parameter of the sets of encode parameters being varied between at least two encoders of the multiple encoders connected in parallel; selecting one set of encode parameters from the sets of encode parameters employed by the multiple parallel connected encoders which best meets an encode objective; and outputting a bitstream of encoded video data encoded from the sequence of video frames using the one set of encode parameters.

In a further aspect, the invention comprises at least one program storage device readable by a machine, tangibly embodying at least one program of instructions executable by the machine to perform a method of encoding a sequence of video frames. The method includes: encoding the sequence of video frames employing multiple parallel connected encoders, each encoder of the multiple encoders receiving the identical sequence of video frames for encoding thereof, wherein each encoder of the multiple encoders employs a set of encode parameters, at least one encode parameter of the sets of encode parameters being varied between at least two encoders of the multiple encoders connected in parallel; selecting one set of encode parameters from the sets of encode parameters employed by the multiple parallel connected encoders which best meets an encode objective; and outputting a bitstream of encoded video data encoded from the sequence of video frames using the one set of encode parameters.

Additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIG. 8 shows a flow diagram of an alternate embodiment of an encoding system 800 in accordance with the principles of the present invention. System 800 employs multiple of parallel connected encoders 820, each of which has an output connected to a respective buffer 825. In this embodiment, the encoded result of each respective encoder 820 is buffered 825 and can then be selected as a final compressed bitstream 870, thereby selectively bypassing the encoding subsystem 850. Switches are provided at the appropriate junctures to select between the encode approaches.

BEST MODE FOR CARRYING OUT THE INVENTION

Figure 1:
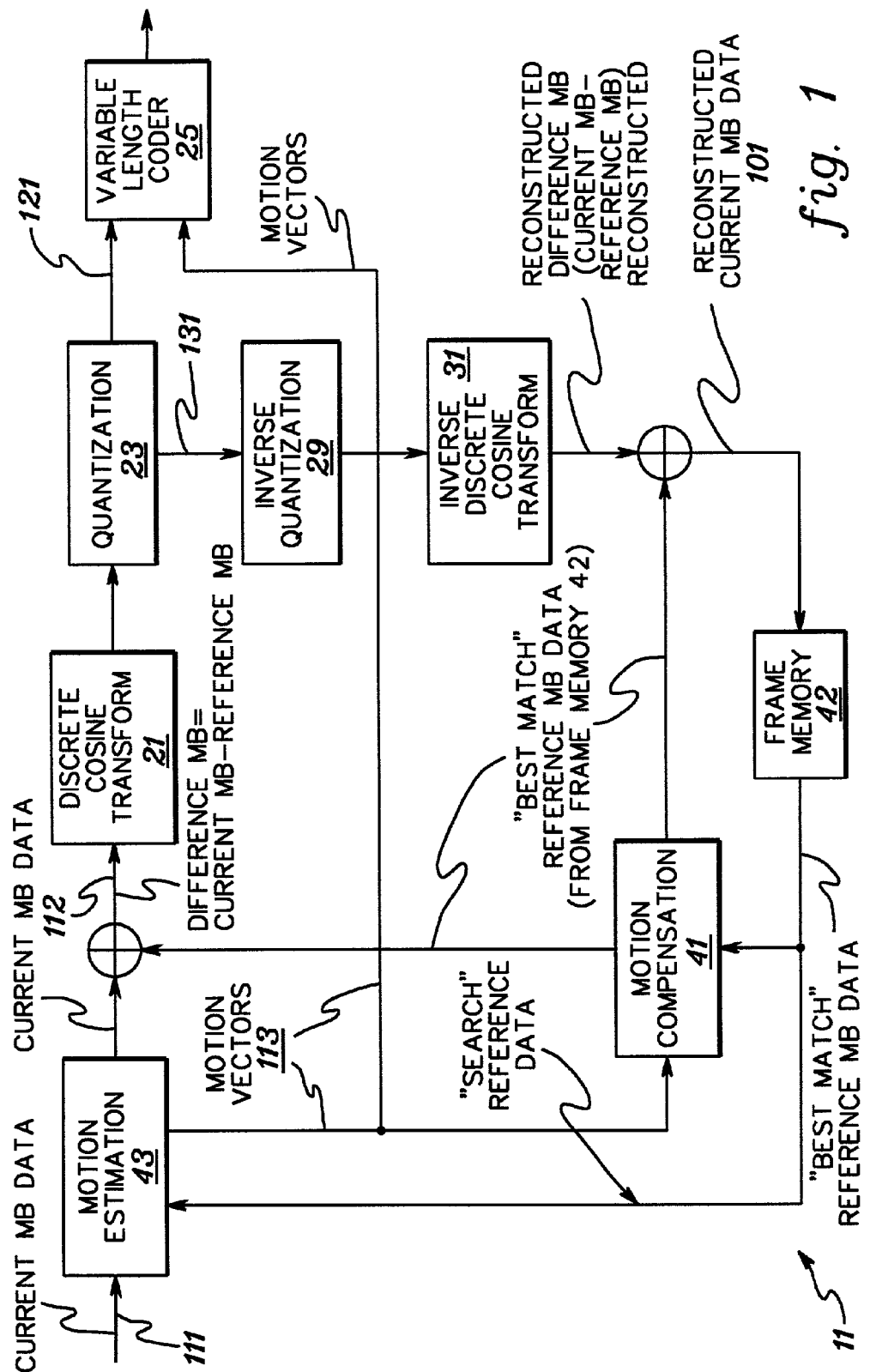
FIG. 1 shows a flow diagram of a generalized MPEG-2 compliant encoder 11, including a discrete cosine transformer 21, a quantizer 23, a variable length coder 25, an inverse quantizer 29, an inverse discrete cosine transformer 31, motion compensation 41, frame memory 42, and motion estimation 43. The data paths include the $i^{th}$ picture input 111, difference data 112, motion vectors 113 (to motion compensation 41 and to variable length coder 25), the picture output 121, the feedback picture for motion estimation and compensation 131, and the motion compensated picture 101. This figure has the assumptions that the $i^{th}$ picture exists in frame memory or frame store 42 and that the $i+1^{th}$ is being encoded with motion estimation.

The invention relates, for example, to MPEG compliant encoders and encoding processes such as described in "Information Technology-Generic coding of moving pictures and associated audio information: Video," Recommendation ITU-T H.262, ISO/IEC 13818-2, Draft International Standard, 1994. The encoding functions performed by the encoder include data input, spatial compression, motion estimation, macroblock type generation, data reconstruction, entropy coding, and data output. Spatial compression includes discrete cosine transformation (DCT), quantization, and entropy encoding. Temporal compression includes intensive reconstructive processing, such as inverse discrete cosine transformation, inverse quantization, and motion compensation. Motion estimation and compensation are used for temporal compression functions. Spatial and temporal compression are repetitive functions with high computational requirements.

More particularly the invention relates, for example, to a process for performing spatial and temporal compression including discrete cosine transformation, quantization, entropy encoding, motion estimation, motion compensation, and prediction, and even more particularly to a system for accomplishing spatial and temporal compression.

The first compression step is the elimination of spatial redundancy, for example, the elimination of spatial redundancy in a still picture of an "I" frame picture. Spatial redundancy is the redundancy within a picture. The MPEG-2 Standard uses a block based method of reducing spatial redundancy. The method of choice is the discrete cosine transformation, and discrete cosine transform coding of the picture. Discrete cosine transform coding is combined with weighted scalar quantization and run length coding to achieve desirable compression.

The discrete cosine transformation is an orthogonal transformation. Orthogonal transformations, because they have a frequency domain interpretation, are filter bank oriented. The discrete cosine transformation is also localized. That is, the encoding process samples on an 8×8 spatial window which is sufficient to compute 64 transform coefficients or sub-bands.

Another advantage of the discrete cosine transformation is that fast encoding and decoding algorithms are available. Additionally, the sub-band decomposition of the discrete cosine transformation is sufficiently well behaved to allow effective use of psychovisual criteria.

After transformation, many of the frequency coefficients are zero, especially the coefficients for high spatial frequencies. These coefficients are organized into a zig-zag or alternate-scanned pattern, and converted into run-amplitude (run-level) pairs. Each pair indicates the number of zero coefficients and the amplitude of the non-zero coefficient. This is coded in a variable length code.

Motion compensation is used to reduce or even eliminate redundancy between pictures. Motion compensation exploits temporal redundancy by dividing the current picture into blocks, for example, macroblocks, and then searching in previously transmitted pictures for a nearby block with similar content. Only the difference between the current block pels and the predicted block pels extracted from the reference picture is actually compressed for transmission and thereafter transmitted.

The simplest method of motion compensation and prediction is to record the luminance and chrominance, i.e., intensity and color, of every pixel in an "I" picture, then record changes of luminance and chrominance, i.e., intensity and color for every specific pixel in the subsequent picture. However, this is uneconomical in transmission medium bandwidth, memory, processor capacity, and processing time because objects move between pictures, that is, pixel contents move from one location in one picture to a different location in a subsequent picture. A more advanced idea is to use a previous or subsequent picture to predict where a block of pixels will be in a subsequent or previous picture or pictures, for example, with motion vectors, and to write the result as "predicted pictures" or "P" pictures. More particularly, this involves making a best estimate or prediction of where the pixels or macroblocks of pixels of the $i^{th}$ picture will be in the $i-1^{th}$ or $i+1^{th}$ picture. It is one step further to use both subsequent and previous pictures to predict where a block of pixels will be in an intermediate or "B" picture.

To be noted is that the picture encoding order and the picture transmission order do not necessarily match the picture display order. See FIG. 2. For I-P-B systems the input picture transmission order is different from the encoding order, and the input pictures must be temporarily stored until used for encoding. A buffer stores this input until it is used.

For purposes of illustration, a generalized flowchart of MPEG compliant encoding is shown in FIG. 1. In the flowchart the images of the $i^{th}$ picture and the $i+1^{th}$ picture are processed to generate motion vectors. The motion vectors predict where a macroblock of pixels will be in a prior and/or subsequent picture. The use of the motion vectors is a key aspect of temporal compression in the MPEG standard. The motion vectors, once generated, are used for the translation of the macroblocks of pixels, from the $i^{th}$ picture to the $i+1^{th}$ picture (see FIG. 1).

As shown in FIG. 1, in the encoding process, the images of the $i^{th}$ picture and the $i+1^{th}$ picture are processed in the encoder 11 to generate motion vectors which are the form in which, for example, the $i+1^{th}$ and subsequent pictures are encoded and transmitted. An input image 111 of a subsequent picture goes to the motion estimation unit 43 of the encoder. Motion vectors 113 are formed as the output of the motion estimation unit 43. These vectors are used by the motion compensation unit 41 to retrieve macroblock data from previous and/or future pictures, referred to as "reference" data, for output by this unit. One output of the motion compensation unit 41 is negatively summed with the output from the motion estimation unit 43 and goes to the input of the discrete cosine transformer 21. The output of the discrete cosine transformer 21 is quantized in a quantizer 23. The output of the quantizer 23 is split into two outputs, 121 and 131; one output 121 goes to a downstream element 25 for further compression and processing before transmission, such as to a run length encoder; the other output 131 goes through reconstruction of the encoded macroblock of pixels for storage in frame memory 42. In the encoder shown for purposes of illustration, this second output 131 goes through an inverse quantization 29 and an inverse discrete cosine transform 31 to return a lossy version of the difference macroblock. This data is summed with the output of the motion compensation unit 41 and returns a lossy version of the original picture to the frame memory 42.

Figure 2:
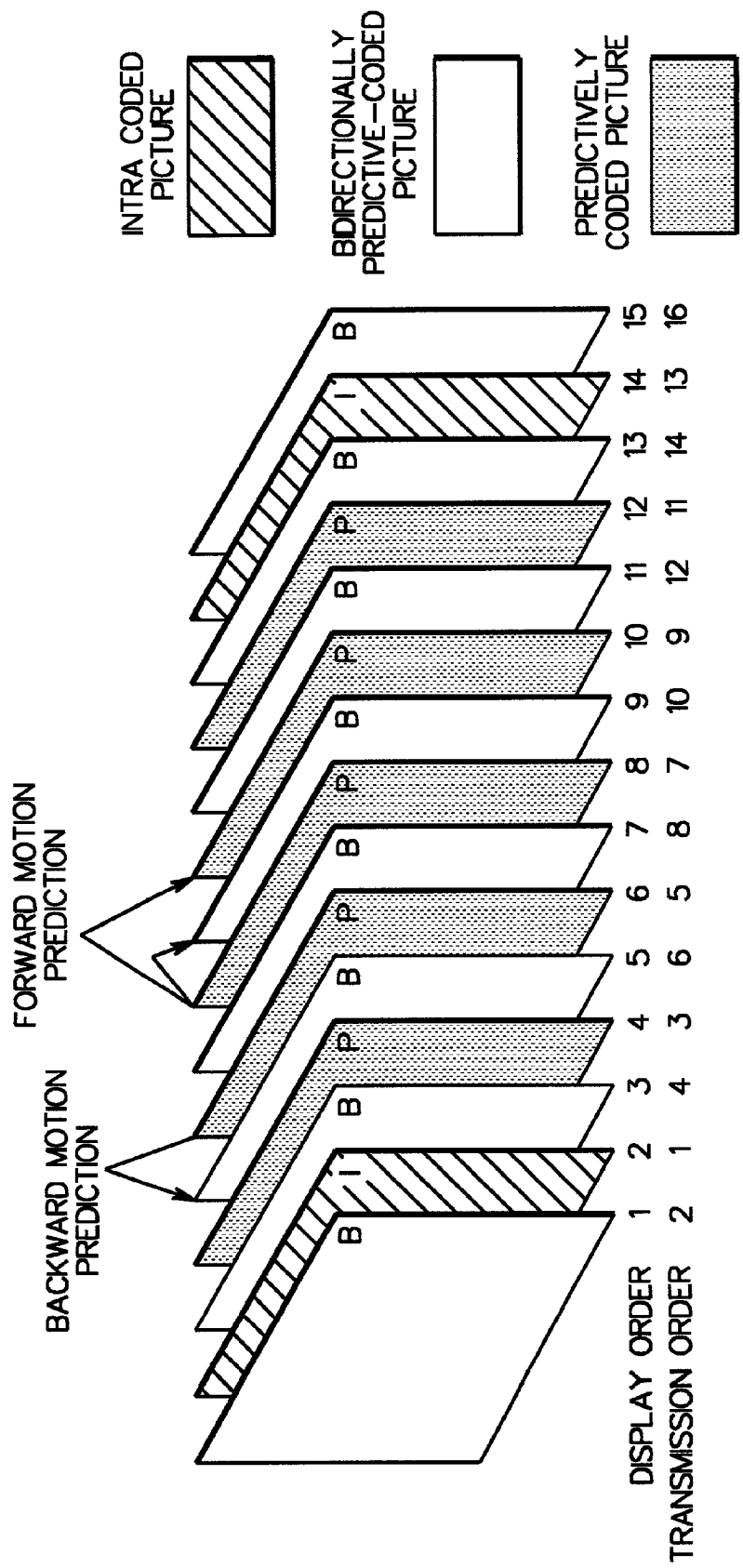
FIG. 2 illustrates the I, P, and B pictures, examples of their display and transmission orders, and forward, and backward motion prediction.

As shown in FIG. 2, there are three types of pictures. There are "Intra pictures" or "I" pictures which are encoded and transmitted whole, and do not require motion vectors to be defined. These "I" pictures serve as a reference image for motion estimation. There are "Predicted pictures" or "P" pictures which are formed by motion vectors from a previous picture and can serve as a reference image for motion estimation for further pictures. Finally, there are "Bidirectional pictures" or "B" pictures which are formed using motion vectors from two other pictures, one past and one future, and can not serve as a reference image for motion estimation. Motion vectors are generated from "I" and "P" pictures, and are used to form "P" and "B" pictures.

Figure 3:
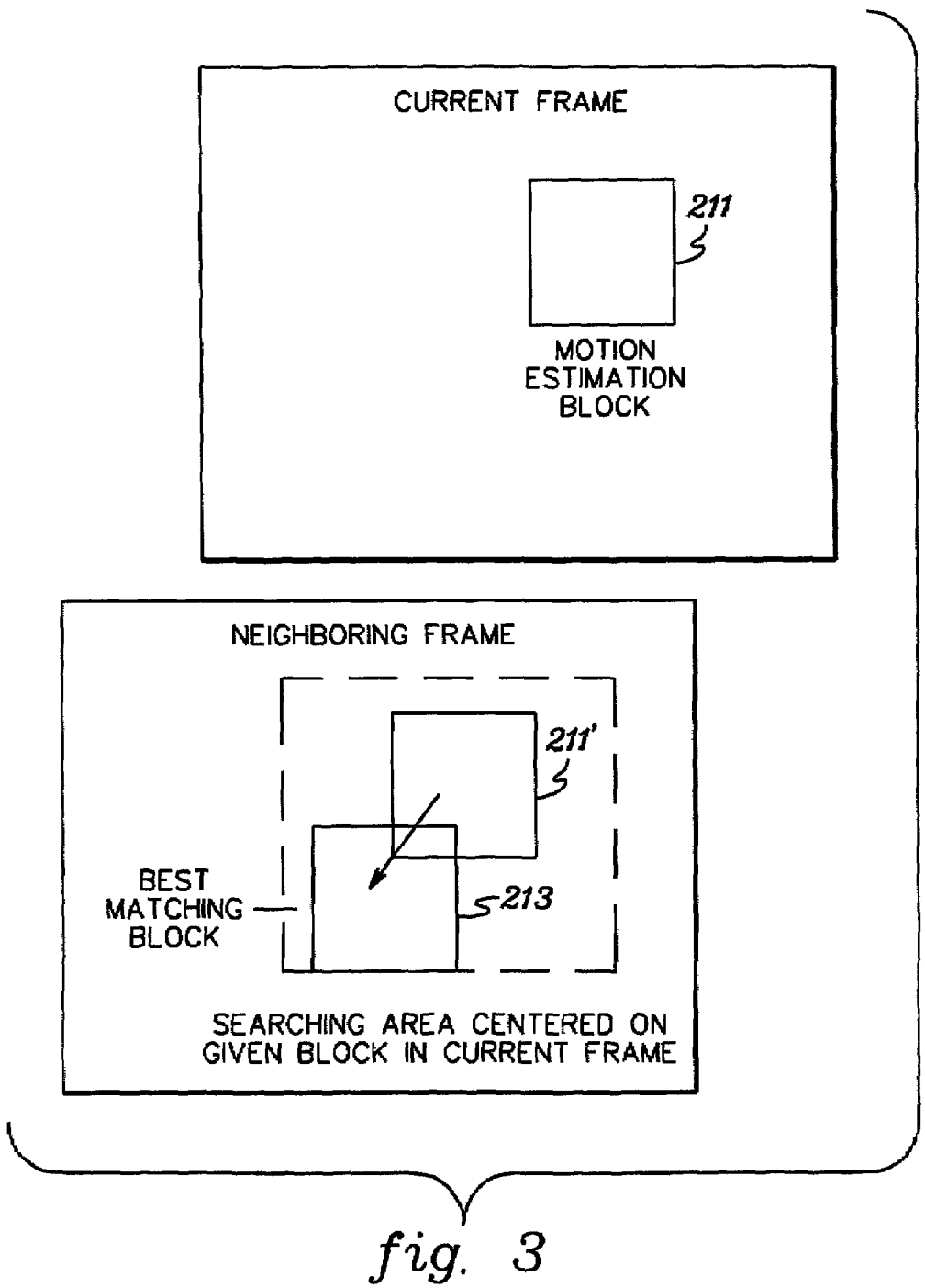
FIG. 3 illustrates the search from the motion estimation block in the current frame or picture to the best matching block in a subsequent or previous frame or picture. Elements 211 and 211' represent the same location in both pictures.
Figure 4:
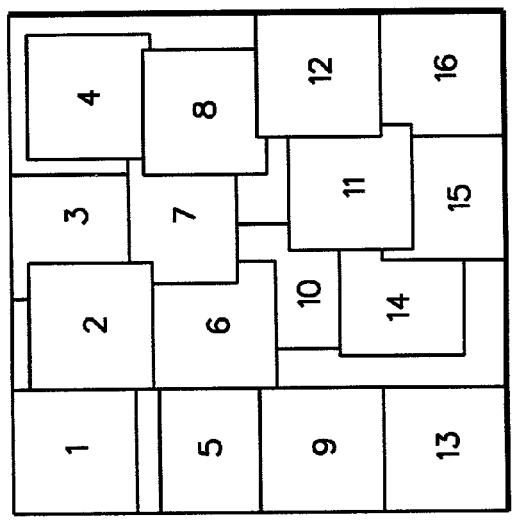
FIG. 4 illustrates the movement of blocks in accordance with the motion vectors from their position in a previous picture to a new picture, and the previous picture's blocks adjusted after using motion vectors.

One method by which motion estimation is carried out, shown in FIG. 3, is by a search from a macroblock 211 of an $i^{th}$ picture throughout a region of the next picture to find the best match macroblock 213. Translating the macroblocks in this way yields a pattern of macroblocks for the $i+1^{th}$ picture, as shown in FIG. 4. In this way the $i^{th}$ picture is changed a small amount, e.g., by motion vectors and difference data, to generate the $i+1^{th}$ picture. What is encoded are the motion vectors and difference data, and not the $i+1^{th}$ picture itself. Motion vectors translate position of an image from picture to picture, while difference data carries changes in chrominance, luminance, and saturation, that is, changes in shading and illumination.

Returning to FIG. 3, we look for a good match by starting from the same location in the $i^{th}$ picture as in the $i+1^{th}$ picture. A search window is created in the $i^{th}$ picture. We search for a best match within this search window. Once found, the best match motion vectors for the macroblock are coded. The coding of the best match macroblock includes a motion vector, that is, how many pixels in the y direction and how many pixels in the x direction is the best match displaced in the next picture. Also encoded is difference data, also referred to as the "prediction error", which is the difference in chrominance and luminance between the current macroblock and the best match reference macroblock.

The operational functions of an MPEG-2 encoder are discussed in detail in the above-incorporated commonly assigned, United States Letters Patents, for example, reference U.S. Pat. No. 6,118,823, by Carr et al., issued Sep. 12, 2000, and entitled "Control Scheme For Shared-Use Dual-Port Predicted Error Array".

As noted initially, encoder performance and/or picture quality may be enhanced through adaptive video encoding. The video encoder is constructed to be adaptive to the video data received as a sequence of frames. In accordance with one embodiment of this concept, two encoding subsystems are employed. A significant advantage of using two encoding subsystems is the ability to analyze the video sequence prior to its real-time encoding. Analysis of the video sequence comprises calculating one or more statistics which can be derived from the video data.

The statistical measures can describe different characteristics of an image frame, for example, busyness of a frame, motion between image frames, scene change or fading, etc. Using the calculated statistics, adaptive encoding of the video sequence is then carried out by controlling one or more encoding parameters of the real-time encoding process. For example, bit allocation, quantization parameter(s), encoding mode, etc., can be changed from frame to frame or macroblock to macroblock within a given frame according to derived statistics of a characteristic (e.g., scene content) of the particular frame(s).

Figure 5:
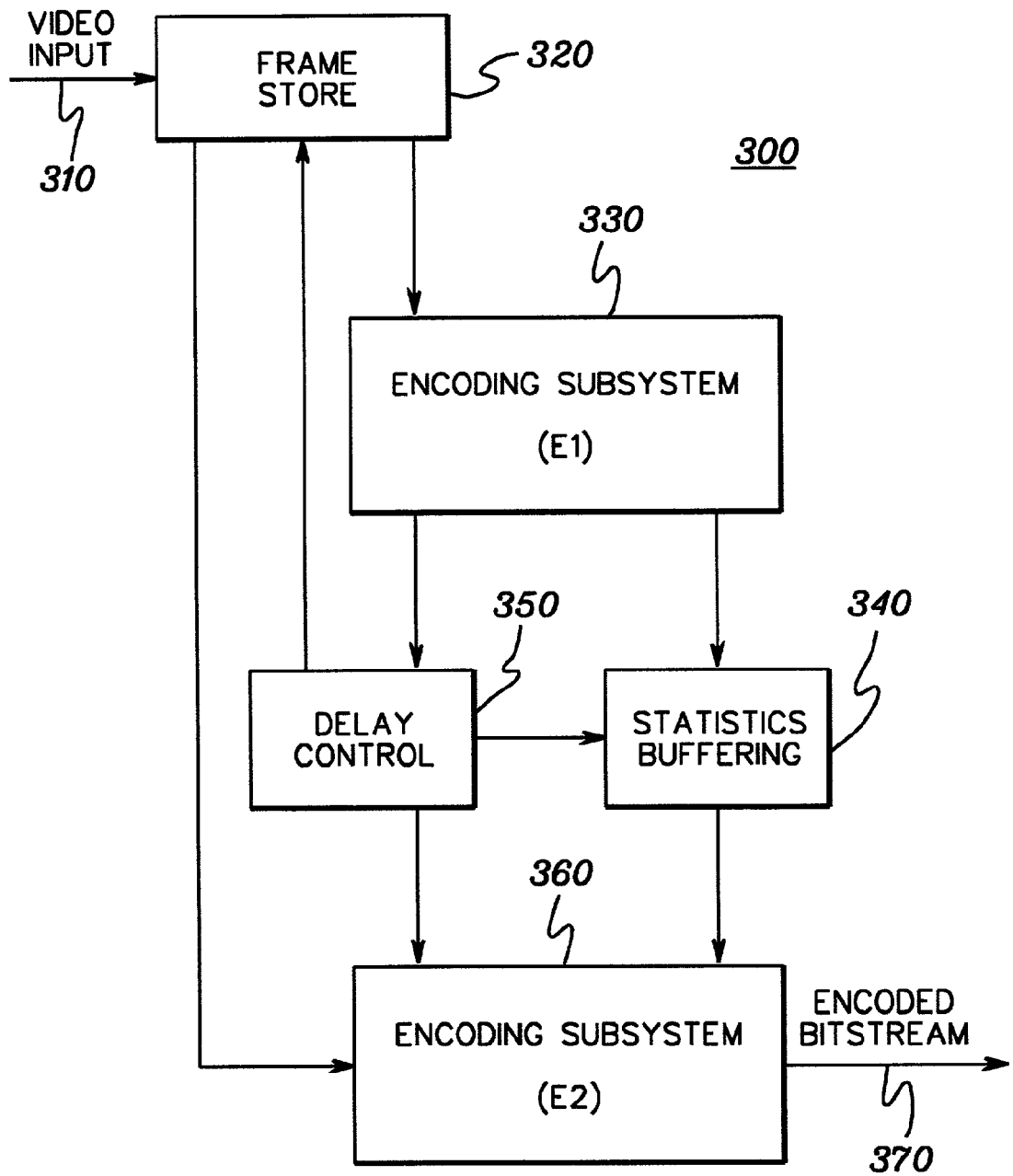
FIG. 5 shows a flow diagram of an encoding system 300 employing a first encoding subsystem E1 and a second encoding subsystem E2. Subsystem E1 is configured to derive statistics on one or more characteristics of a sequence of frames to be encoded. These characteristics are employed by subsystem E2 to adaptively encode the sequence of frames to optimize picture quality and/or encoding performance.

One embodiment of such an encoding system, generally denoted 300, is depicted in FIG. 5. The MPEG Standard is again assumed herein for purposes of explanation; however, those skilled in the art will understand that other implementations and standards can employ the adaptive encoding concepts. System 300 includes two encoder subsystems, designated E1 330 and E2 360. In one implementation, encoder subsystems E1 and E2 are assumed to have identical hardware, but different software as described hereinbelow. E1 is programmed to generate the desired statistics, such as inter-frame/intraframe non-motion, motion, etc. statistics, which are important to the encoding subsystem's (E2) specific bit rate control algorithm. E2 generates encoded frames based on the statistics generated by encoding subsystem E1.

Operationally, a sequence of video frames 310 is initially received into a frame store 320, where one or more frames are buffered depending upon the encoding specification (e.g., I, IP, IBP, IBBP encoding). This is accomplished by partitioning frame store 320 into an appropriate number of picture buffers (determined by group of picture (GOP) structure). These partitions are managed by a delay control logic 350. After sufficient delay, again determined by implementation, the video frame information is passed to encoder subsystem E1 330, which derives the information on image statistics and stores this information in a statistics buffer 340 on a frame-by-frame basis. The delay control hardware 350 manages buffering of incoming video data and of image statistics, and feeds the video frames from frame store 320, as well as the derived statistics from statistics buffering 340, to encoding subsystem E2 360 in encode order. Using these statistics, subsystem E2 adaptively encodes the frames as described further below and outputs the encoded bitstream 370 in real time, delayed only by sufficient frame time to allow encoding subsystem E1 to generate the statistics on one or more characteristics of the received video input 310.

Further details of this adaptive encoding system of FIG. 5 are provided in the above-referenced U.S. Pat. No. 5,978,029.

Generally stated, the present invention comprises alternate types of adaptive encoding systems. In a first type, depicted in FIG. 6, parallel look-ahead encoding of a single channel of video data is employed. Multiple encoders are shown running simultaneously using different sets of encoding parameters and the identical stream of video data as input. This is contrasted with a typical statistical multiplex system wherein each encoder would have a different source. The output of each of the parallel encoders could be a single channel bitstream (as explained further below in connection with FIG. 8).

Figure 6:
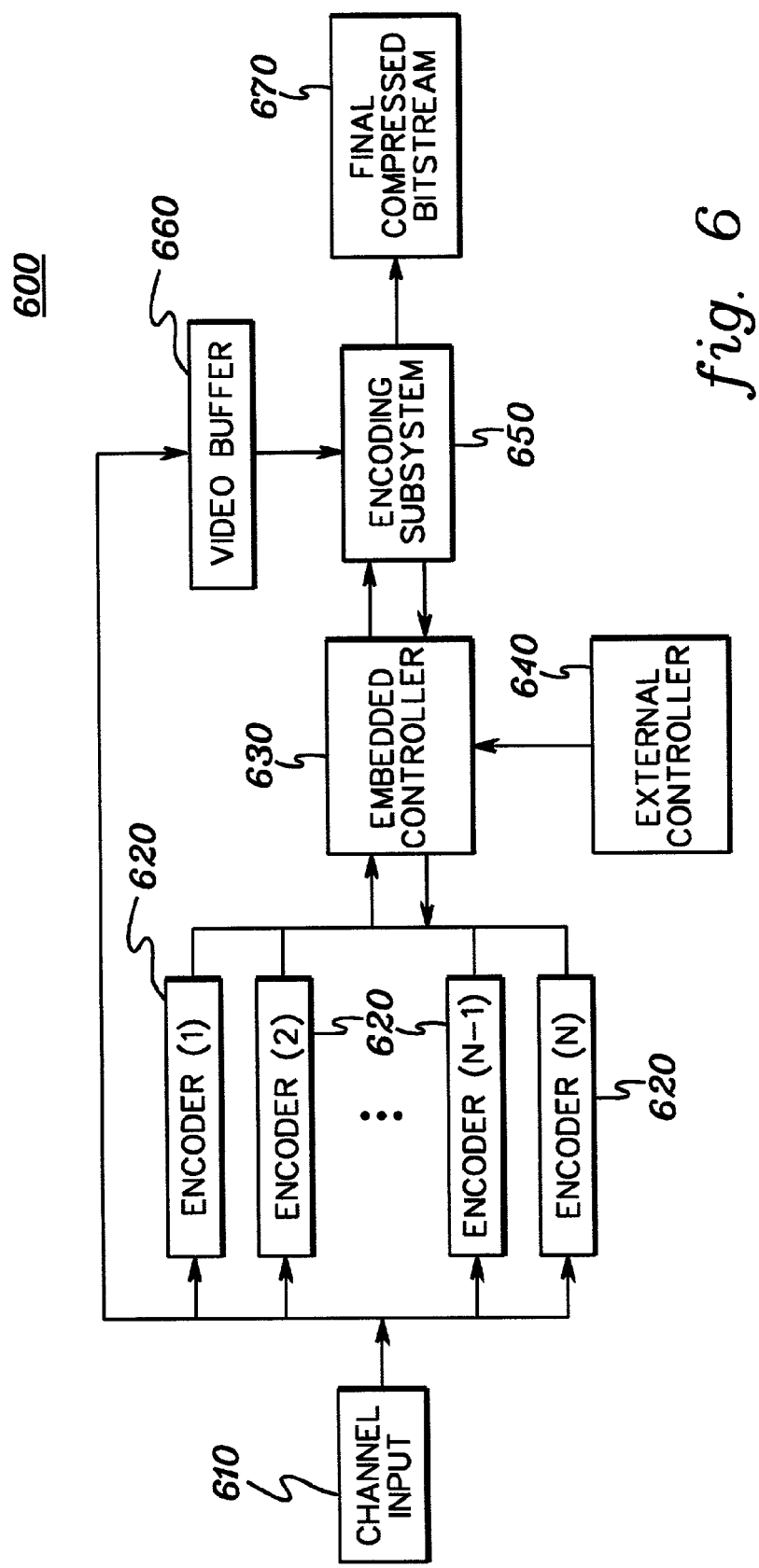
FIG. 6 depicts a flow diagram of an encoding system 600, employing multiple parallel connected encoders 620 and an encoding subsystem 650 coupled together by control logic 630 & 640, in accordance with the principles of the present invention. The encoders 620 each employ a set of encode parameters and one or more parameters of each set are varied between the encoders in order that the controller may select a best set of encode parameters for use by the encode subsystem 650 in encoding a sequence of video frames.

In the embodiment of FIG. 6, there is no channel multiplexer in the encoding unit, but multiple such units could be used at a higher level to create a statistical multiplex system if desired. Each of the parallel encoders employs a different set of parameters, which may be predetermined. These parameters in one embodiment may comprise static parameters. Examples of parameters which could be varied between the encoders include: field/frame encoding, dc precision, zig-zag/alt scan, quant table values, target bitrate and picture quality indicator (PQI).

In one embodiment, the set of parameters which yields the best picture quality (for a given bit rate) may be chosen. That is, the encoder (or set of parameters from that encoder) which produces the best picture for a given picture (GOP, etc.) may be used to produce the final bitstream. Those skilled in the art will note that the parallel look-ahead encode system of FIG. 6 is a single-pass system. In this embodiment, encoder settings (i.e., the sets of parameters employed) are not based on results of prior encoding (but could be if desired) as in a cascade configuration. Again, multiple encoding systems such as depicted in FIG. 6 could be used at a higher level to create a cascade system. This particular adaptive encoding system does not comprise a serial "learning" or dynamic parameter determination process over multiple pictures. Rather, the set of parameters producing the encoded video stream of highest quality, for example, is immediately selected and outputted.

Referring more specifically to FIG. 6, one embodiment of a parallel look-ahead encode system, generally denoted 600, in accordance with the principles of the present invention is shown. System 600 receives as input a stream of video data from a single input channel 610. Thus, the identical video sequence is forwarded to multiple encoders 620 (labeled encoder (1), encoder (2) . . . encoder (n-1), encoder (n)). Note that the number of encoders employed in parallel can be variable depending upon the desired number of parameters to be varied between the encoders. As one example, there may be 100 or more encoders coupled in parallel to receive the same sequence of video data. Also, although four or more parallel encoders 620 are depicted for system 600, as few as two encoders may be employed in accordance with the principles of the present invention. As one example, each encoder 620 could comprise a 4:2:0 encoder and be set up to determine the best picture quality indicator (PQI) set of parameters for each picture or group of pictures (GOP) of the sequence of video frames.

As explained further below, the different sets of encode parameters can be statically or dynamically set based upon, for example, past encode history and/or anticipated type of video data to be received. One object of this processing may be to optimize the set of encode parameters around a local maximum, e.g., best picture quality as measured by a picture quality analysis such as a Tektronix tool, which is an industry standard tool used to compare picture quality. (The Tektronix picture quality tool is available from Tektronix, Inc. of Wilsonville, Oreg.)

In one embodiment, the sets of parameters employed by encoders 620 could be provided by an embedded controller 630, which could be responsive to an external controller 640. As one example, embedded controller 630, which may comprise a field programmable gate array, may initialize the sets of parameters to be employed by the parallel encoders 620. The parallel encoders each forward (in one embodiment) the encoded picture stream to the embedded controller 630 (e.g., using statistics) which determines, for example, which encoded stream comprises the best picture quality. Further, in one embodiment, embedded controller 630 may essentially characterize the type of video received and encoded by the parallel encoders. Based upon this characterization, the best set of parameters is selected for use by a subsequent encoding subsystem 650. The type of video sequences may include video that comprises difficult video, for example, with high detailing and/or many sequential scene changes; fading/dissolving video; high/fast motion video; low/slow motion video; a movie source video; partial still frames; and still frames.

Alternatively, the control logic could receive PQI data parameters from each encoder 620. The control logic would then determine the best parameters (given the encoding objective) for each picture and send those settings (i.e., the optimal set of encode parameters) to the subsequent encoding subsystem. As one example, the best set of encode parameters are sent to encoding subsystem 650, which may comprise a 4:2:2 encoder, for final compression and output of the final compressed bitstream 670. Encoding subsystem 650 receives the sequence of video data through a first-in first-out (FIFO) buffer 660, which may hold one or more pictures of the sequence of video data or a group of pictures (GOP) from the sequence as timing requires to allow for the parallel encoding and logical analysis of the results thereof. For example, FIFO buffer 660 may need to hold one to sixteen or more frames of video data.

The encoding subsystem 650 could itself comprise a cascaded encode system such as described in the above-incorporated U.S. Pat. No. 5,978,029. Those skilled in the art will note that by performing parameter comparisons for each picture prior to final compression by encoding subsystem 650, the present invention can improve picture quality for each encoded picture frame, thus improving the overall picture quality of the encoded video stream.

In accordance with the principles of the present invention, various encode objectives can be selected and met. As one example, controller 630 of the parallel look-ahead encode system of FIG. 6 may allow a user to select via external controller 640 one or more of a plurality of possible encode objectives, including: constant quality; video buffer verifier (VBV); buffer fullness; constant bits per picture; constant bit rate (CBR); transrating/transcoding; and variable bit rate encoding (VBR).

For example, the VBR objective, which translates into near constant quality per channel, can be achieved by changing the channel bit rate based on the content of the source material. Each of the parallel encoders can be initialized to have similar GOP structures with different average bit rates. The embedded controller analyzes the statistics from each of the encoders and decides which of the encoders most closely meets the bit usage requirement while also maintaining near constant quality. If a minor modification is needed to reduce the bit usage, the bit rate of the optimal parallel encoder can be reduced slightly when fed to the encoder subsystem. This modification can also be fed back to the parallel encoders for subsequent refinement. Those skilled in the art will note that the other objectives can be met in a similar manner. In the discussion below, the encode objective is assumed to comprise constant picture quality. Those skilled in the art will note that various combinations of encode objectives and assumptions are possible. For example, in one embodiment the encode objective may comprise a dual objective of near constant quality and CBR, with initial assumptions being that full VBV buffer is available, VBR is not allowed, a lowest bit rate that will provide an acceptable quality is to be used, and the resulting bitstream is encoded from a single channel of video.

Figure 7:
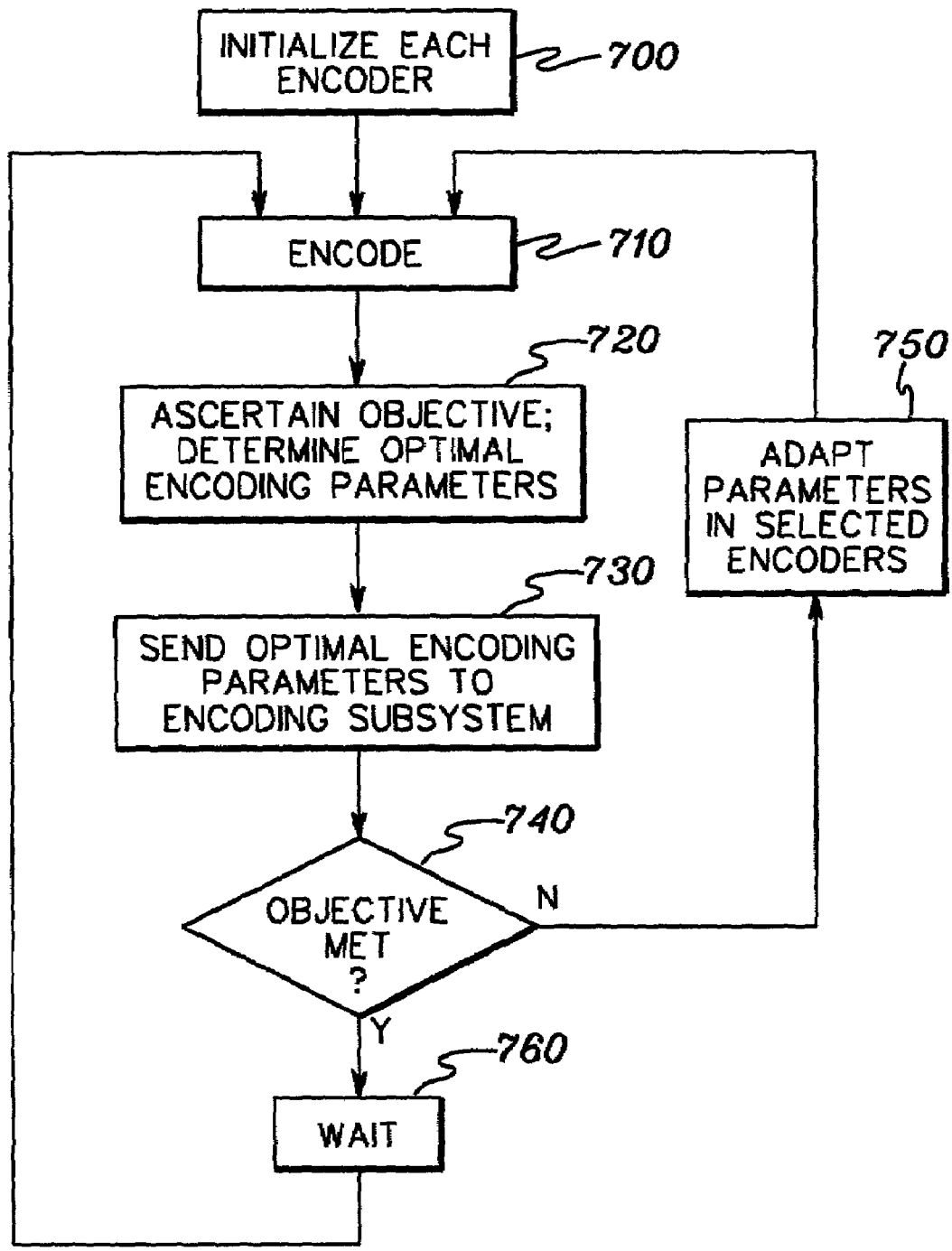
FIG. 7 is a flowchart of one embodiment of processing performed by the control logic 630 & 640 of the encode subsystem of FIG. 6.

FIG. 7 is a high level flowchart of one embodiment of processing implemented by, for example, controller 630 of encode system 600 of FIG. 6. The controller first initializes each of the parallel encoders 700 with a set of encode parameters. The assumption underlying the present invention is that information gathered from the pre-encoding steps described herein is more useful and informative than raw pixel manipulation. Initialization parameters may thus include one or more of the bit rate of the encoded stream; field or frame encoding; GOP structure, e.g., number of B pictures and distance between I pictures; and 3:2 pull down inversion.

Subsequent to initialization, the stream of video data is encoded by each of the multiple encoders 710. In addition, the controller ascertains the encode objective, for example, from the above-listed possible objectives, and determines an optimal set of encoding parameters 720. Examples of statistics received at the controller from the parallel encoders may include for each encoder: bits used; average mquant; maximum horizontal, maximum vertical motion vectors; picture quality indicator (PQI); picture type; picture information (such as scene change, whether the picture is a still picture, whether there is a bad reference picture, or whether there is a B picture scene change); average activity; and VBV fullness.

If the video buffer 660 (FIG. 6) holds buff_size pictures, then the controller accumulates statistics from the parallel encoders for frames one through buff_size. One way to decide which set of encoder parameters deliver the best quality is in accordance with the following pseudocode (wherein a lowest PQI represents the best picture quality):

```
if pqi(enc,p) represents a vector describing the picture quality
indicator statistic, and enc represents a variable pointing to each encoder
and
                         P represents a
variable pointing to each picture,
    then
            for(enc=1,n){              //
n=number of encoders in parallel
                temp=0;
                for(p=1,buff_size){       //
buff_size=number of pictures that the video buffer can hold
                    temp=temp+pqi(enc,p);
                }
                avg_pqi (enc)=temp/buff_size;
                if (enc==1∥(avg_pqi(enc)<temp_min))
{
                    temp_min=avg_pqi(enc); // setting
up which encoder has best average pqi number
                    best_enc=enc;
                }
            }
```

After being determined, the optimal set of encode parameters is forwarded to the encoding subsystem 730. In one example, the set of encode parameters used by an encoder 620 (FIG. 6), as described by best_enc, is forwarded to the encoding subsystem 650 (FIG. 6) for final encoding of the bitstream. After encoding the first frame, the controller determines whether the objective was met 740 and if so, waits 760 a predetermined period of time before reevaluating the selected set of encode parameters. In one example, the set of encode parameters could be reevaluated with each frame being encoded, thereby potentially changing one or more encode parameters of the set with each picture of the sequence. If the objective is unmet, then the controller adapts at least one encode parameter in one or more of the parallel encoders 750 with the goal of meeting the objective with the next selected set of encode parameters.

The optimal encoding parameters forwarded from the controller to the encoding subsystem may include one or more of: bit rate; field or frame encoding; GOP structure; 3:2 pull down inversion (PDI); target bits per picture; predicted average mquant; search range; promote P to I; demote I to P; average activity; and VBV buffer fullness.

FIG. 8 depicts an alternate embodiment of a parallel look-ahead encode system, generally denoted 800, in accordance with the principles of the present invention. System 800 again receives a video sequence from a single channel input 810 and forwards the sequence in parallel to a bank of encoders 820 each of which receives the identical video data sequence for encoding. As with the embodiment of FIG. 6, each encoder 820 has a different set of parameters for encoding the video sequence. An embedded controller 830 selects, based on statistical analysis, the best set of encode parameters to meet the desired encode object, which can be set for example by a user through an external controller 840. The encode parameter set is then forwarded to an encoding subsystem 850 which retrieves from a video buffer 860 the stream of video data for encoding and outputting of a final compressed bitstream 870.

In encode system 800, a switch mechanism is provided wherein the actual encoded bitstreams from the bank of encoders 820 can be buffered 825 for selection of a best compressed bitstream by controller 830. When active, switches 827 between encoders 820 and buffers 825 allow for the storage of the compressed bitstreams in the buffers. In one example, the buffers may hold one GOP length of frames for subsequent selection by the controller. That is, a controller selects which encoded bitstream has the best encode characteristics, and selects that stream for forwarding as the final compressed bitstream. Controller 830 also sends feedback to the encoder bank 820 as noted in FIG. 7 in order to adapt one or more encode parameters in one or more selected encoders of the bank, for example, to better meet a user selected objective.

In this encode mode, switch 845 and switch 847 are off blocking the forwarding of information from controller 830 to encoding subsystem 850, and from channel input 810 to video buffer 860, respectively. A switch control signal, labeled SW1, can be forwarded from controller 830 to each of the respective switches 827, 845 and 847.

One detailed example of processing in accordance with the present invention is described below with reference to the encode system of FIG. 6. In this example, given a fixed bit rate, the encode objective is to determine which encoder outputs the best quality signal as determined by PQI and the encoder statistics registers. Three encoders 620 are assumed to be connected in parallel, and the video buffer 660 buffers fifteen pictures. (That is, buff_size=15.) The encoders are initialized as set forth in Table 1.

The controller first ascertains the objective, which in this example is which encoder has the best PQI for a given bit rate. This can be determined from the following pseudocode:

```
Pseudocode:
  for(enc=1,n){ //n=number of encoders in parallel
    pqi_accum(enc)=0;
    for(p=1,buff_size){ //buff_size=number of pictures that the video
                          buffer can hold
      pqi_accum(enc)=pqi_accum(enc)+pqi(pqi,p);
    }
    if (enc==1||pqi_accum(enc)<best_pqi){
      best_pqi=pqi_accum(enc);
      best_enc=enc;
    }
```

The encoding subsystem is then set up with the parameters defined by the best_enc encoder (for example, if best_enc=1, then send to the encoding subsystem the parameters used for encoder(1)). If no scene changes were predicted in the incoming video, then since encoder(1) had the best PQI (i.e., had optimal parameters), no changes are made. Assume encoder(2) and encoder(3) had much worse PQI values, then encoder(2) and encoder(3) parameters can be changed to take better advantage of the fact that a difficult source is being encoded. If scene changes were predicted in the incoming video, then the initial encoding parameters can be used for the respective encoders.

The present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

TABLE 1

| Types of Source Material | Encoder | Initialization Parameters: GOP Structure | Initialization Parameters: Encoding Mode | Initialization Parameters: Other |
| --- | --- | --- | --- | --- |
| Difficult, high detailed many sequential scene changes, fades, dissolves, fast motion | encoder (1) | I and P pictures GOP = 15 | Frame Encoding | |
| Typical, Normal video, Few Scene changes | encoder (2) | IPBB GOP = 15 OPEN GOP | Frame Encoding | |
| Simple, Low Motion, slow motion, partial stills, stills | encoder (3) | IPBB GOP = 21 (LargerGOP) OPEN GOP | Frame Encoding | 32PDI |

The object is to initialize each encoder with a set of parameters that will characterize the source material. The types of source material appear in the leftmost column of Table 1. Again, examples of initialization parameters include target bit rate, field or frame encoding, as well as GOP structure and 3:2 pull down inversion. An "open GOP" means that a B picture can reference a picture outside of its own GOP.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A system for encoding a sequence of video frames comprising:
    multiple encoders connected in parallel, each encoder receiving for encoding identical video data of the sequence of video frames, wherein each encoder of said multiple encoders employs a set of encode parameters, each set of encode parameters comprising multiple types of encode parameters, at least one type of encode parameter of the sets of encode parameters being varied between at least two encoders of the multiple encoders connected in parallel;
    a controller coupled to the multiple encoders for selecting one set of encode parameters from the sets of encode parameters which best meets an encode objective;
    means for outputting a bitstream of encoded video data encoded from the sequence of video frames using said one set of encode parameters; and
    wherein said controller further comprises means for automatically adapting an encode parameter in one or more encoders of the multiple encoders when no set of encode parameters of the sets of encode parameters employed by the multiple encoders produces an encoded result which meets the encode objective.

2. The system of claim 1, wherein said sequence of video frames comprises a single channel bitstream of video data.

3. A system of claim 1, wherein the set of encode parameters employed by each encoder of said multiple encoders comprises a predetermined static set of parameters.

4. The system of claim 3, wherein the at least one type of encode parameter of the sets of encode parameters varied between the at least two encoders of said multiple encoders is at least two of:
    a bit rate for a resultant encoded stream;
    field or frame encoding;
    group of picture (GOP) structure, including number of B pictures and distance between I pictures; and
    3:2 pull down inversion.

5. The system of claim 1, wherein said controller selects the set of encode parameters which yields the best picture quality as measured by a picture quality indicator (PQI), wherein the encode objective comprises best picture quality.

6. The system of claim 1, wherein said bitstream of encoded video data is produced by said system in a single pass of said sequence of video frames through said system.

7. The system of claim 1, wherein said controller ascertains the encode objective from a plurality of possible encode objectives.

8. The system of claim 7, wherein the encode objective comprises one of best picture quality, constant picture quality, VBV buffer fullness, constant bits per picture, constant bit rate (CBR), transrating/transcoding, or variable bit rate encoding (VBR).

9. The system of claim 1, wherein the set of encode parameters employed by each encoder of the multiple encoders comprises at least two of the following parameters: bit rate; field or frame encoding; GOP structure; 3:2 PDI; target bits per picture; predicted average mquant; search range; promote P to I; demote I to P; average activity; and VBV buffer fullness.

10. The system of claim 1, wherein said controller comprises means for user selection of the encode objective, and user initialization of one or more encode parameters in the sets of encode parameters employed by the multiple encoders.

11. The system of claim 1, wherein said means for outputting comprises an encode subsystem separate from the multiple parallel connected encoders for subsequently encoding the sequence of video frames using said one set of encode parameters ascertained from the multiple parallel connected encoders to produce said bitstream of encoded video data.

12. The system of claim 1, wherein said means for outputting comprises means for outputting an encode result of an encoder of the multiple encoders employing said selected one set of encode parameters, wherein said encoded result comprises said bitstream of encoded video data.

13. The system of claim 12, wherein said means for outputting comprises multiple buffers, each buffer connected to an output of a respective encoder of said multiple encoders, and means for forwarding a buffered encoded result of the encoder having the selected one set of encode parameters.

14. The system of claim 13, wherein each buffer comprises memory for storing encoded video data comprising at least one encoded frame of the sequence of video frames.

15. The system of claim 14, wherein each buffer of said multiple buffers comprises memory for holding a number of encoded frames of the sequence of video frames sufficient to allow said controller to select said encoded result which best meets the encode objective.

16. The system of claim 13, further comprising an encode subsystem, and means for switching between said means for selecting and said encode subsystem, wherein said bitstream of encoded video data can be taken as an output of one encoder of said multiple encoders, or can comprise an output of said encode subsystem as determined by said means for switching.

17. A method of encoding a sequence of video frames comprising:
    encoding the sequence of video frames employing multiple parallel connected encoders, each encoder of the multiple encoders receiving for encoding identical video data of the sequence of video frames, wherein each encoder of the multiple encoders employs a set of encode parameters, each set of encode parameters comprising multiple types of encode parameters, at least one type of encode parameter of the sets of encode parameters being varied between at least two encoders of the multiple encoders connected in parallel;
    selecting one set of encode parameters from the sets of encode parameters employed by the multiple parallel connected encoders which best meets an encode objective;
    outputting a bitstream of encoded video data encoded from the sequence of video frames using the one set of encode parameters; and
    wherein said selecting further comprises automatically adapting an encode parameter in one or more encoders of the multiple encoders when no set of encode parameters of the sets of encode parameters employed by the multiple encoders produces an encoded result which meets the encode objective.

18. The method of claim 17, further comprising receiving the sequence of video frames across a single channel of video data.

19. The method of claim 17, wherein the at least one type of encode parameter of the sets of encode parameters of said multiple encoders is at least two of:
a bit rate for a resultant encoded stream;
field or frame encoding;
group of picture (GOP) structure, including number of B pictures and distance between I pictures; and
3:2 pull down inversion.

20. The method of claim 17, wherein said bitstream of encoded video data is produced in a single pass of said data through said encoding.

21. The method of claim 17, further comprising ascertaining the encode objective from a plurality of possible encode objectives prior to selecting said one set of encode parameters from the sets of encode parameters employed by the multiple parallel connected encoders.

22. The method of claim 21, wherein the encode objective comprises one of best picture quality, constant picture quality, VBV buffer fullness, constant bits per picture, constant bit rate (CBR), transrating/transcoding, or variable bit rate encoding (VBR).

23. The method of claim 17, wherein the set of encode parameters employed by each encoder of the multiple encoders comprises at least two of: bit rate; field or frame encoding; GOP structure; 3:2 PDI; target bits per picture; predicted average mquant; search range; promote P to I; demote I to P; average activity; and VBV buffer fullness.

24. The method of claim 17, wherein said selecting comprises user selecting of the encode objective, and user initialization of one or more encode parameters in the sets of encode parameters employed by the multiple encoders.

25. The method of claim 17, wherein said outputting comprises subsequently encoding the sequence of video frames separate from the multiple parallel connected encoders using the one set of encode parameters ascertained from the multiple parallel connected encoders to produce said bitstream of encoded video data.

26. The method of claim 17, wherein said outputting comprises selecting an encoded result of an encoder of the multiple encoders employing the selected one set of encode parameters, wherein the encoded result comprises the bitstream of encoded video data.

27. The method of claim 26, wherein said outputting comprises buffering encoded results produced by the multiple encoders, and forwarding for output the buffered encoded result of the encoder employing the selected one set of encode parameters.

28. The method of claim 27, wherein said buffering comprises storing one or more encoded frames of the sequence of video frames sufficient to allow the selecting of the encoded result which best meets the encode objective.

29. The method of claim 27, further comprising switching between said selecting a buffered encoded result, and subsequently encoding the sequence of video frames using the selected set of encode parameters, wherein said bitstream of encoded video data can be taken as output of one encoder of said multiple encoders, or can comprise an output of an encode subsystem performing said subsequent encoding.

30. At least one program storage device readable by a machine, tangibly embodying at least one program of instructions executable by the machine to perform a method of encoding a sequence of video frames, the method comprising:
encoding the sequence of video frames employing multiple parallel connected encoders, each encoder of the multiple encoders receiving for encoding identical video data of the sequence of video frames, wherein each encoder of the multiple encoders employs a set of encode parameters, each set of encode parameters comprising multiple types of encode parameters, at least one type of encode parameter of the sets of encode parameters being varied between at least two encoders of the multiple encoders connected in parallel;
selecting one set of encode parameters from the sets of encode parameters employed by the multiple parallel connected encoders which best meets an encode objective;
outputting a bitstream of encoded video data encoded from the sequence of video frames using the one set of encode parameters; and
wherein said selecting further comprises automatically adapting an encode parameter in one or more encoders of the multiple encoders when no set of encode parameters of the sets of encode parameters employed by the multiple encoders produces an encoded result which meets the encode objective.

31. The at least one program storage device of claim 30, further comprising receiving a sequence of video frames across a single channel of video data.

32. The at least one program storage device of claim 30, wherein said bitstream of encoded video data is produced in a single pass of said data through said encoding.

33. The at least one program storage device of claim 30, further comprising ascertaining the encode objective from a plurality of possible encode objectives prior to selecting said one set of encode parameters from the sets of encode parameters employed by the multiple parallel connected encoders.

34. The at least one program storage device of claim 32, wherein the encode objective comprises two of best picture quality, constant picture quality, VBV buffer fullness, constant bits per picture, constant bit rate (CBR), transrating/transcoding, or variable bit rate encoding (VBR).

35. The at least one program storage device of claim 30, wherein said outputting comprises subsequently encoding the sequence of video frames separate from the multiple parallel connected encoders using the one set of encode parameters ascertained from the multiple parallel connected encoders to produce said bitstream of encoded video data.

36. The at least one program storage device of claim 30, wherein said outputting comprises selecting an encoded result of an encoder of the multiple encoders employing the selected one set of encode parameters, wherein the encoded result comprises the bitstream of encoded video data.

* * * * *

UNITED STATES PATENT AND TRADEMARK OFFICE
CERTIFICATE OF CORRECTION

| | | |
|---|---|---|
| PATENT NO. | : 7,072,393 B2 | Page 1 of 1 |
| APPLICATION NO. | : 09/888964 | |
| DATED | : July 4, 2006 | |
| INVENTOR(S) | : Boice et al. | |

It is certified that error appears in the above-identified patent and that said Letters Patent is hereby corrected as shown below:

Title Page:

item (75) Inventors

Delete "Charles C. Stein, Peckville, PA (US)" and insert --Charles J. Stein, Peckville, PA (US)--

Signed and Sealed this

Fifth Day of September, 2006

JON W. DUDAS
*Director of the United States Patent and Trademark Office*